United States Patent [19]

Wargo et al.

[11] Patent Number: 4,623,924
[45] Date of Patent: Nov. 18, 1986

[54] VIDEO SIGNAL AUTO PEAKING CIRCUITRY

[75] Inventors: Robert A. Wargo, Ringoes; Leopold A. Harwood, Bridgewater, both of N.J.

[73] Assignee: RCA Corporation, Princeton, N.J.

[21] Appl. No.: 702,618

[22] Filed: Feb. 19, 1985

[51] Int. Cl.$^4$ .............................................. H04N 5/14
[52] U.S. Cl. ..................................... 358/166; 358/37; 358/39
[58] Field of Search ................... 358/37, 39, 166, 174

[56] References Cited

U.S. PATENT DOCUMENTS

| | | | |
|---|---|---|---|
| 4,231,065 | 10/1980 | Fitch et al. | 358/166 |
| 4,384,306 | 5/1983 | Liu | 358/166 |
| 4,509,080 | 4/1985 | Lagoni et al. | 358/166 |
| 4,538,178 | 8/1985 | Bolger | 358/39 |
| 4,554,532 | 11/1985 | Ise et al. | 358/174 |
| 4,571,620 | 2/1986 | Anderson | 358/166 |

*Primary Examiner*—John W. Shepperd
*Assistant Examiner*—Cynthia Smith
*Attorney, Agent, or Firm*—E. M. Whitacre; P. J. Rasmussen; E. P. Herrmann

[57] ABSTRACT

A peaking circuit for use in a digital video signal processing system includes a digital peak detector which produces a peak magnitude whenever the slope of the video signal changes polarity. The peak magnitudes, and the absences of peaks are summed in an accumulator over a field period. The accumulated peaks are applied to a gain calculating circuit which develops a peaking control signal having three regimes. For low valued accumulated peaks the gain or peaking control signal is constant and relatively large. For high valued accumulated peaks the gain is constant and negative. In between the gain is in inverse porportion to the value of the accumulated peaks.

9 Claims, 5 Drawing Figures

VIDEO SIGNAL AUTO PEAKING CIRCUITRY

The present invention relates to apparatus for enhancing high frequency response of video signals in a digital video signal processing system.

A reproduced image developed in response to video signals processed by a television receiver can be subjectively improved or enhanced by increasing the slope or steepness of video signal amplitude transitions. Enhancements of this type are commonly referred to as signal peaking and are generally associated with the higher frequency components of the video signal.

U.S. Pat. No. 4,399,460 discloses an analog video signal peaking system including a gain controlled amplifier which selectively amplifies video signal in the frequency range from 0.9 MHz to 2.7 MHz. Signal from this amplifier is added back into the broad-band video signal to effect peaking of signal in the frequency range from 0.9–2.7 MHz. The combined signal is peak detected to develop the gain control signal for controlling the frequency selective amplifier. The gain control signal affords high amplification for low amplitude combined signals and lower amplification for higher amplitude signals. Between about 35 and 55 percent of the maximum amplitude of the combined signal the gain of the frequency selective amplifier is reduced to zero.

U.S. Pat. No. 4,110,790 discloses another analog auto peaking circuit including a frequency selective gain circuit and a peak detector. In this arrangement the amplitude of the peaks of video signal from the frequency selective gain circuit are detected to develop a control signal which is fed back in a closed loop to control the gain of the circuit. A video output signal from the gain circuit is coupled back to the broad-band video signal to produce a peaked video signal.

U.S. Pat. No. 4,081,836 discloses video signal peaking apparatus wherein the luminance signal may be peaked or depeaked to increase or decrease respectively the slope of signal transitions. In this apparatus the luminance signal is band-pass filtered and amplified as a function of AGC voltage. The amplified band-pass filtered signal is thereafter combined with the broad-band luminance signal to form a frequency selective peaked signal.

SUMMARY OF THE INVENTION

The present invention includes a digital auto peaking circuit for selectively peaking/depeaking predetermined frequency components of a digital video signal. The circuit includes a digital band-pass filter having a pass-band in the range of signal frequencies to be peaked/depeaked. A peak detector coupled to the band-pass filter extracts signal peak amplitudes whenever the slope of the signal changes polarity. An accumulator sums the magnitudes of the peaks bver a relatively long time period, e.g. a field period. The accumulated value, or a portion thereof is coupled to a gain determining element which develops a control signal. A multiplier/attenuator is coupled to the band-pass filter, and responsive to the control signal, develops a video peaking signal having frequencies in the pass-band of the filter.

An additional feature of an embodiment of the invention includes a gain determining element which develops a first constant gain factor for relatively low accumulated peak magnitudes, a second constant gain factor for relatively large accumulated peak magnitudes, and a variable gain factor for accumulated peak magnitudes between said relatively large and relatively low magnitudes.

A further embodiment includes a summer which is coupled to the multiplier/attenuator to combine the processed band-passed video signal with broad-band video signal to produce a frequency selectively peaked/depeaked video signal.

DETAILED DESCRIPTION

In the figures, broad arrows interconnecting circuit elements represent multiconductor busses for parallel bit digital samples. Narrow arrows represent single conductor connections.

Figure 1:
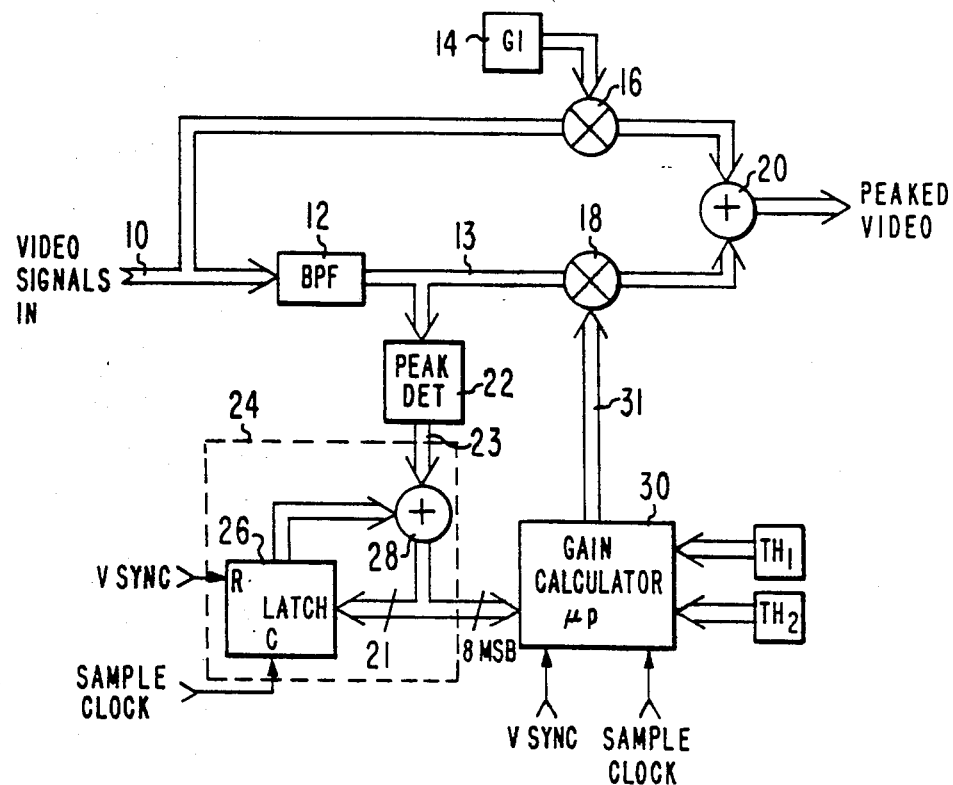
FIG. 1 is a block diagram of a digital video signal peaking/depeaking circuit embodying the present invention.

Referring to FIG. 1, broad-band digital video signal, e.g. luminance signal from a chrominance/luminance separator in a television receiver, is applied to input bus 10. This signal is applied to a gain element 16 wherein it is amplified (multiplied) by a gain factor G1 from a source of gain factor 14. Amplified broad-band video signal from element 16 is applied to one input port of a signal summer 20.

Broad-band video signal on bus 10 is also applied to the input port of a band-pass filter 12. The band-pass filter 12 selectively passes signal in a predetermined band of frequencies, e.g. 2–4.2 MHz. Band-pass filtered video signal from filter 12 is applied to a gain element 18 wherein it is scaled by a gain/attenuation signal provided on bus 31. Band-pass filtered video signal from gain element 18 is coupled to a second input port of the signal summer 20 wherein it is combined with the broad-band video signal. The output signal from signal summer 20 is a broad-band video signal with signal components in the frequency pass-band of band-pass filter 12 selectively amplified or attenuated relative to the out-of-band frequency components.

The gain/attenuation signal on bus 31 is developed responsive to the peaks of excursions of band-pass filtered video signal from filter 12. Video signal samples from band-pass filter 12 are applied to a peak detector 22. Peak detector 22 provides magnitude values approximating the peaks of signal excursions and zero values during signal intervals between positive and negative signal peaks.

Peak magnitude and zero values from peak detector 22 are applied to an accumulator (ACC) 24. Accumulator 24 sums the zeroes and peak magnitude values from peak detector 22 over e.g. a field period. Statistically it has been determined that for video signal sampled at four times the color subcarrier rate and converted to 8-bit digital codewords, a 21-bit accumulator is sufficient to sum the peak magnitudes of one field of the band-pass filtered video signal. At the end of each active field of video information the accumulator 24 is reset to zero by e.g. a vertical synchronization pulse Vsync.

Over a field period there are approximately 120,000 possible signal peaks. The actual number of peaks is significantly less than this number. For the illustrative embodiment it is presumed that only one peak occurs for a possible 16 signal peak periods. Further, the accumulated peak magnitude value is not the parameter of interest, but rather the average peak value. To produce the average peak magnitude value the accumulator output is divided by a factor of $2^{13}$. The division is accomplished simply by utilizing the eight most significant bits (MSB's) of the 21-bit accumulator output.

The 8-MSB's from accumulator 24 are applied to a gain calculator 30 which may be a microprocessor or a ROM look up table. At the end of each field period the 8-MSB's of the accumulated value is latched in the gain calculator by the Vsync pulse. This value is used to determine the gain factor provided on bus 31 for the succeeding field interval. (For some applications it may be desirable to smooth the output of the accumulator by low-pass filtering before application to the gain calculator.)

Two threshold values, $TH_1$ and $TH_2$, are applied to gain calculator 30. The threshold values may be constants fixed in hardware, or they may be variable under user control.

Figure 4:
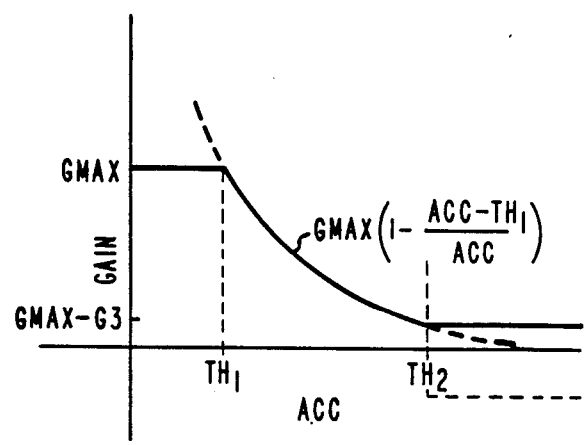
FIG. 4 is a graph of the gain vs. accumulated peak magnitude function of the FIG. 3 gain control element.

The gain control signal developed on bus 31 by gain calculator 30 is dependent on the value of the 8-MSB's of the accumulator output. The gain function is illustrated in FIG. 4 wherein the ordinate represents the relative gain value and the abscissa represents the 8-bit accumulator output value. For low accumulator output values, i.e. less than $TH_1$, the gain is a relatively large and constant value Gmax. For accumulator output values between $TH_1$ and $TH_2$ the gain value follows the curve $Gmax(1-(ACC-TH_1)/ACC)$. The gain curve in this region is chosen to maintain the amplitude of the band-passed signal relatively constant. Finally for accumulator output values greater than $TH_2$ the gain value is again constant and at a lower value designated Gmax-$G_S$.

The gain, G, over the frequency spectrum passed by the band-pass filter 12, developed at the output of signal summer 20, is the sum of the gain values developed on bus 31 and the gain value $G_1$ from source 14. Thus, the gain G is: $G=Gmax+G_1$ for ACC less than $TH_1$; $G=G_1+Gmax(1=(Acc-TH_1)/ACC)$ for $TH_1<ACC<TH_2$; and $G=G_1+(Gmax-G_3)$ for ACC greater than $TH_2$. Note that if $G_3$ is selected to be equal to Gmax then the total gain, G, is equal to $G_1$ for ACC greater than $TH_2$. If $G_3$ is selected to be greater than Gmax, the total gain, G, is less than $G_1$, and the signal spectrum in the pass-band of filter 12 will be depeaked or attenuated relative to the broad-band video signal. This latter gain value is the one preferred for use in conjunction with this invention and is represented by the dotted line in FIG. 4. Other gain functions may be substituted in phase of the described function as required for a particular peaking/depeaking response.

Figure 2:
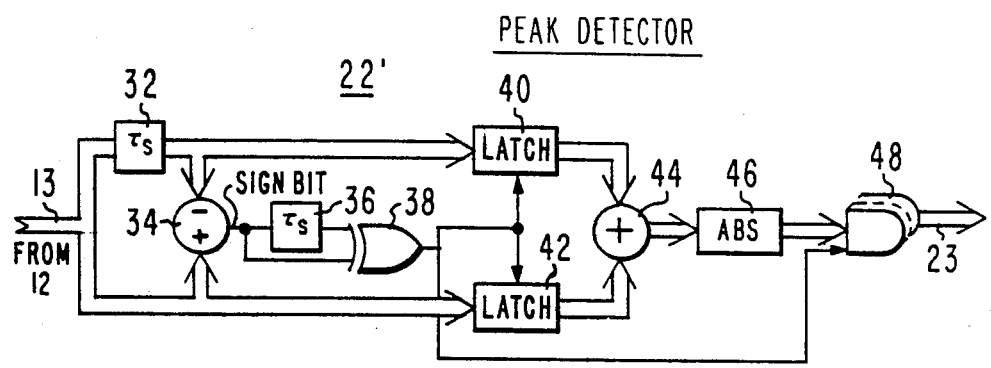
FIG. 2 is a block diagram of a peak detecting circuit which may be substituted in the FIG. 1 circuit.

FIG. 2 is an exemplary digital peak detector and will be described with reference to the FIG. 5 waveforms. In FIG. 2, the output of band-pass filter 12, available on bus 13, is applied to one sample delay element 32 and as the minuend input to subtracter 34. The delayed output from delay element 32 is applied as the subtrahend input to subtracter 34. Only the sign bit, i.e. the polarity indication, is used from subtracter 34 and applied to one input of exclusive OR (XOR) 38, and to the one sample period delay element 36. The output of delay element 36 is applied to the second input of XOR 38. Note XOR 38 develops a logic one output only for unequal logic values occurring on its two input connections.

The output of XOR 38 is applied to the control input terminals of latches 40 and 42 which have respective data input ports connected to delay element 32 and bus 13. The output ports of latches 40 and 42 are applied to respective input ports of adder 44. The output of adder 44 is coupled to a magnitude detector 46, the output of which is coupled to a gate circuit 48 which in turn is controlled by the output signal from XOR 38.

Figure 5:
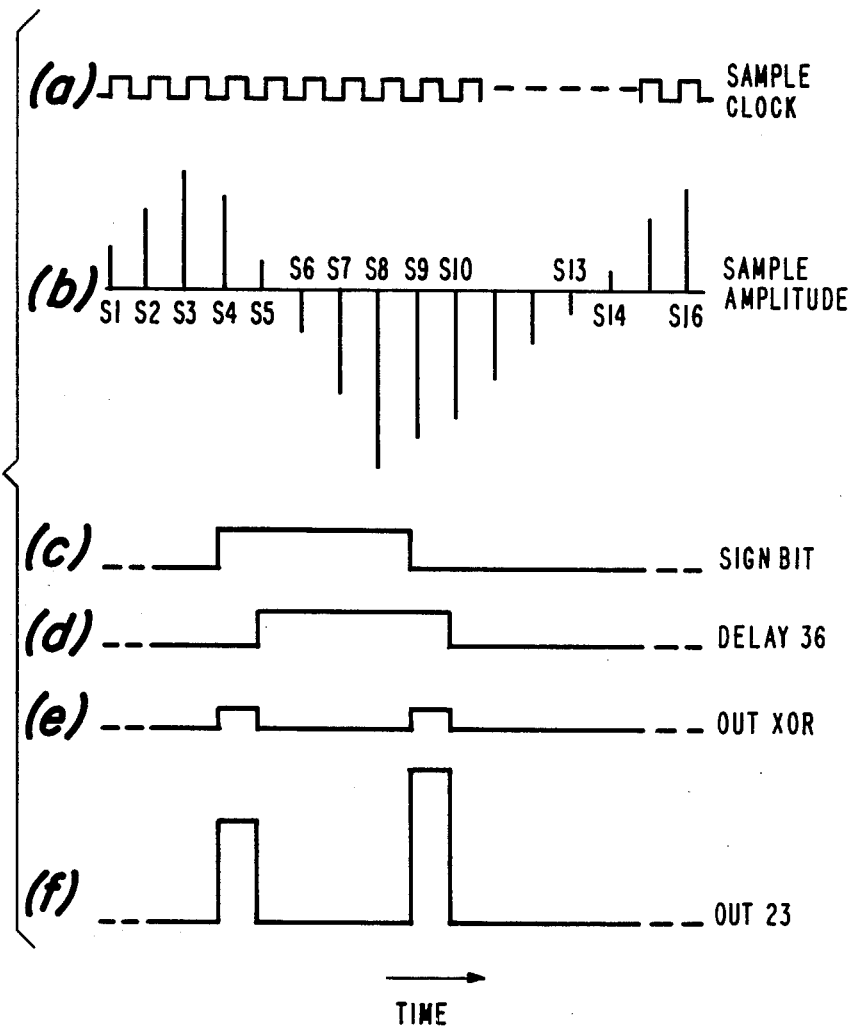
FIG. 5 is a waveform diagram of potentials at various points of the FIG. 2 circuit.

Referring to FIG. 5, waveform (a) illustrates the sample clock which defines the rate of occurrence and the positioning of signal samples on bus 13. Waveform (b) illustrates the amplitude value of an exemplary sequence of input samples. The samples are illustrated as impulses for clarity, but in fact, each sample value has a duration of approximately one sample clock period. Consider that sample S2 is currently available on bus 13. During this time sample S1 is available at the output of delay element 32. Subtracter 34 subtracts the amplitude value of sample S1 from the amplitude value of S2. Since sample S2 is greater than S1 the sign bit from subtracter 34 is a logic zero indicating a positive result and is illustrated in waveform (c). When sample S3 occurs on bus 13, sample S2 will be output by delay element 32. Since sample S3 is greater than sample S2 the difference S3−S2 is a positive value and the sign bit from subtracter 34 is again a logic zero. Now when samples S4 and S3 are respectively available on bus 13 and at the output of delay element 32, subtracter 34 will develop a logic one sign bit value indicating a negative result, since sample S4 is less than sample S3. The differences of successive samples from sample S4 to sample S8 will all be negative. Thus, the sign bit from subtracter 34 will remain in the logic one state until the occurrence of sample S9. Sample S9 is greater than sample S8 and each succeeding sample from sample S8 to sample S16 is larger than the respective preceding sample. Subtracter 34 therefor develops a logic zero sign bit output from sample S9 to sample S16 indicating positive differences.

The transitions in the sign bit output (waveform C) indicate a change in slope of the envelope of the input samples.

Waveform (d) illustrates the delayed sign bit output from delay element 36. Waveforms (c) and (d) are the logic input signals to XOR 38. At those times when waveforms (c) and (d) differ, i.e. between samples S4–S5 and S9–S10, XOR 38 develops a logic one output signal as indicated in waveform (e).

On the positive going output transitions of XOR 38, the respective samples at the data input ports of latches 40 and 42 are loaded into the latches. Thus, when waveform (e) goes high at sample S4, sample S4 is stored in latch 42 and sample S3 is stored in latch 40. These sample values are retained in the latches until sample S9 at which time waveform (e) again goes high and samples S9 and S8 are stored in the latches.

The pairs of samples stored in latches 40 and 42 are summed in adder 44 to produce an N-bit sum. Only the N−1 MSB's from adder 44 are output to effect an averaging of the two sample values. The average values are applied to magnitude detector 46 which converts all of the respective averages to a single polarity. The magnitudes are gated to the output port 23 of the peak detector via gates 48. The output signal provided on bus 23 is illustrated in waveform (f). Each peak average is output for one sample clock period and a zero value is output between peaks.

An alternate embodiment of a peak detector may dispense with latch 42 and adder 44. In this arrangement samples from latch 40 are applied directly to magnitude detector 46.

Figure 3:
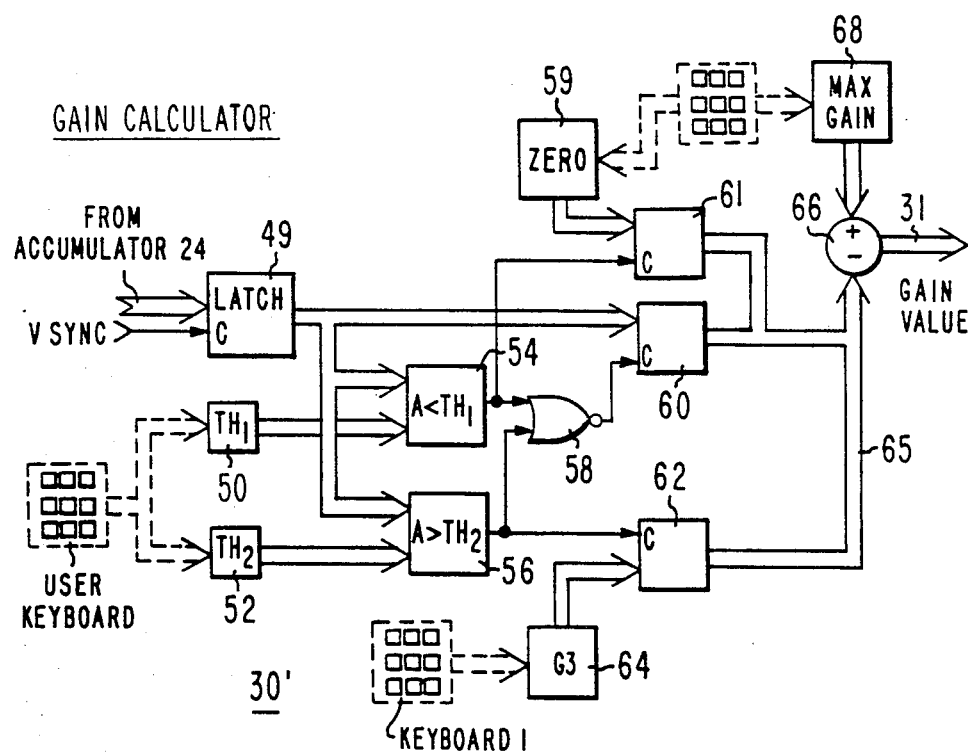
FIG. 3 is a block diagram of a gain control element which may be substituted in the FIG. 1 circuit.

FIG. 3 illustrates an exemplary gain calculator circuit. The gain control signal is produced by subtracter 66 which subtracts one of three signals from a maximum gain value supplied by source 68. The particular one of the three signals that is subtracted from the maximum gain value is dependent on the logic output signals from comparators 54 and 56.

The 8-MSB's of the peak magnitude sums from accumulator 24 are stored in latch 49 under the control of the vertical synchronization pulse Vsync at the end of each field period. The stored value is applied to the two comparators 54 and 56. The threshold value $TH_1$ from source 50 is applied to a second input port of comparator 54 which develops a logic one output signal only when the stored value is less than $TH_1$. The threshold value $TH_2$ from a source 52 is applied to a second input port of comparator 56 which develops a logic one output signal only when the stored value exceeds the value of $TH_2$.

The output signals from comparators 54 and 56 are applied to NOR gate 58 which produces a logic one only if both inputs are low, which occurs when the value in latch 49 is greater than $TH_1$ but less than $TH_2$. When this condition is satisfied, the value supplied by latch 49 or a portion thereof is gated via gate 60 to the subtracter 66. In this instance the output gain value corresponds to a point on the FIG. 4 curve between $TH_1$ and $TH_2$.

If the value stored in latch 49 is less than $TH_1$, the output of comparator 54 is a logic one. This conditions the gate 61 to couple a zero value signal from source 59 to subtracter 66. In this instance the value of the gain signal produced by subtracter 66 is Gmax.

Finally if the value stored in latch 49 is greater than $TH_2$, comparator 56 produces a logic one output which conditions gate 62 to couple a signal G3 from source 64 to subtracter 66. In this instance the gain output value from subtracter 66 is Gmax-$G_3$.

It will be appreciated that the values in sources 59, 64 and 68 may all be designed in hardware or they may be generated under user control to establish the most desirable system performance according to user preference.

It may appear inappropriate to average the peak magnitudes over a field interval. For example, if the scene consists of a relatively non-detailed image but contains several large image transitions, the accumulated peak value may be less than for a busy image with small transitions. The resulting peaking gain factor for the non-detailed image will tend to be large, much larger in fact than for an image with many large signal peaks. It may be expected that the large gain would undesirably affect the reproduced image. Quite to the contrary, the large gain applied when there are few large peaks tends to enhance the image. Consider the image to be a close up of a person wearing jewelry. The signal representing the jewelry will contain relatively large peaks. When these peaks are amplified with the inordinately large gain the jewelry will be reproduced with added sparkle. In general, the peaking gain signal developed over the entire image and applied over the succeeding image period tends to produce more desirable images than a peaking gain signal developed and applied on an instantaneous or sample by sample basis.

What is claimed is:

1. Apparatus for peaking a portion of the frequency spectrum of a digital video signal, wherein said digital video signal occurs in field segments, comprising:
   an input port for applying said digital video signal;
   a filter coupled to said input port for selectively passing said portion of the frequency spectrum of said digital video signal;
   means coupled to said filter for detecting the magnitude of peaks of the filtered video signal;
   an accumulator coupled to said peak detecting means for summing the peak magnitude values over an interval of substantially at least one field interval;
   gain calculating means coupled to said accumulator for developing a gain control signal, said gain control signal having a relatively large value for accumulated sums being less than a first predetermined value, having a substantially lesser value for accumulated sums greater than a second predetermined value and having a value in inverse proportion to said accumulated sums for accumulated sums between said first and second predetermined values; and
   means including scaling means coupled to said filter and said gain calculating means for scaling said filtered video signal in response to said gain control signal to produce a video output signal.

2. The apparatus set forth in claim 1 wherein the means including scaling means further comprises a signal summer having a first input port coupled to said input port for applying digital video signal, a second input port coupled to said scaling means and an output port at which video signal is developed wherein frequency components of said video signal passed by said filter are peaked/depeaked relative to frequency components of the video signal which are not passed by said filter.

3. The apparatus set forth in claim 1 wherein the means for detecting peaks comprises:
   an input bus;
   a delay element coupled to said input bus;
   a subtracter having first and second input ports coupled respectively to said input bus and said delay elements, and having an output terminal at which a signal representing the polarity of sample differences is available;
   means coupled to said subtracter output terminal for producing, at an output thereof, a control pulse when the polarity of the sample differences changes;
   a latch coupled to one of said delay elements and said input bus and responsive to said control pulse for storing a video sample when the polarity of sample differences changes; and
   a means including a magnitude detector coupled to said latch, for converting samples applied thereto to one polarity sample, and developing at an output thereof said peak magnitudes.

4. The apparatus set forth in claim 3 wherein the means including a magnitude detector further includes gating means serially coupled with said magnitude detector and responsive to said control pulse for passing peak values therethrough and for providing zero values in the absence of said control pulse.

5. The apparatus set forth in claim 1 wherein said gain calculating means comprises a microprocessor.

6. The apparatus set forth in claim 1 wherein said gain calculating means comprises:

first and second comparators having input ports coupled to said accumulator, said first comparator developing an output signal for the accumulated sum being less than said first predetermined value, said second comparator developing an output signal for the accumulated sum exceeding said second predetermined value;

first, second and third sources of gain values;

a subtracter having a minuend input port coupled to said third source of gain values having a subtrahend input port, and having an output port at which said gain control signal is produced;

gating means responsive to the signal from said first comparator for coupling said first source of gain values to said subtrahend input port, responsive to the signal from said second comparator for coupling said second source of gain values to said subtrahend input port, and responsive to the absence of signals developed from said first and second comparators for coupling said accumulator to said subtrahend input port.

7. The apparatus set forth in claim 6 wherein said second gain value from said second source exceeds said third gain value from said third source, so that the gain control signal produced by said subtracter is negative.

8. The apparatus set forth in claim 6 wherein the means for detecting peaks comprises:

an input bus;

a delay element coupled to said input bus;

a subtracter having first and second input ports coupled respectively to said input bus and said delay elements, and having an output terminal at which a signal representing the polarity of sample differences is available;

means coupled to said subtracter output terminal for producing, at an output thereof, a control pulse when the polarity of the sample differences changes;

a latch coupled to one of said delay elements and said input bus and responsive to said control pulse for storing a video sample when the polarity of sample differences changes; and means including a magnitude detector coupled to said latch, for converting samples applied thereto to one polarity sample, and developing at an output thereof said peak magnitudes.

9. Apparatus for peaking a video signal occurring in field sequences, comprising:

an input bus for applying said video signal to be peaked;

scaling means coupled to said input bus and having a control input port for applying a peaking control signal, said scaling means scaling said video signal under the control of said peaking control signal;

peak detecting means coupled to said input bus for detecting the magnitude of peaks of said video signal;

means coupled to said peak detecting means for developing a signal corresponding to the energy density of said video signal over a field interval;

gain calculating means responsive to said signal developing means for producing said peaking control signal wherein said peaking control signal is relatively large for said energy density being less than a first predetermined value, is negative for said energy density being greater than a second predetermined value, and is in inverse porportion to said energy density for said energy density being between said first and second predetermined values.

* * * * *